United States Patent
Ueda et al.

(10) Patent No.: US 9,415,452 B2
(45) Date of Patent: Aug. 16, 2016

(54) TOOL HOLDER ATTACHING/DETACHING STRUCTURE OF MACHINE TOOL

(71) Applicant: DMG MORI SEIKI CO., LTD., Yamatokoriyama-shi, Nara-ken (JP)

(72) Inventors: Toshio Ueda, Yamatokoriyama (JP); Yumi Suzuki, Yamatokoriyama (JP); Soichiro Yamada, Yamatokoriyama (JP)

(73) Assignee: DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 245 days.

(21) Appl. No.: 14/229,901

(22) Filed: Mar. 29, 2014

(65) Prior Publication Data
US 2014/0294523 A1 Oct. 2, 2014

(30) Foreign Application Priority Data

Mar. 29, 2013 (JP) ................................. 2013-001784

(51) Int. Cl.
| | |
|---|---|
| *B23B 31/113* | (2006.01) |
| *B23C 5/00* | (2006.01) |
| *B23Q 3/12* | (2006.01) |
| *B23B 29/24* | (2006.01) |
| *B23B 31/40* | (2006.01) |
| *B23B 31/30* | (2006.01) |

(52) U.S. Cl.
CPC ............... *B23C 5/006* (2013.01); *B23B 29/242* (2013.01); *B23B 31/113* (2013.01); *B23B 31/4073* (2013.01); *B23Q 3/12* (2013.01); *B23B 31/30* (2013.01); *B23B 2270/025* (2013.01); *B23C 2210/24* (2013.01); *Y10T 407/1934* (2015.01); *Y10T 409/309408* (2015.01)

(58) Field of Classification Search
CPC .... B23B 31/113; B23B 31/30; B23B 31/302; B23B 31/24; B23B 2231/26; B23Q 17/006; B23Q 17/002; B23Q 17/22; B23C 5/26; B23C 5/265; B23C 3/06; Y10T 409/309408; Y10T 409/30952
USPC ............... 409/232, 234; 279/93, 94, 126, 141
See application file for complete search history.

(56) References Cited

U.S. PATENT DOCUMENTS

| | | | | |
|---|---|---|---|---|
| 3,603,203 A | * | 9/1971 | Rhodes ................ | B23Q 17/006 408/11 |
| 4,325,664 A | * | 4/1982 | Mori ..................... | B23C 5/2278 279/8 |
| 4,504,824 A | * | 3/1985 | Mello ................... | B23B 49/001 340/680 |

(Continued)

FOREIGN PATENT DOCUMENTS

| | | | | |
|---|---|---|---|---|
| JP | | 57114310 A | * | 7/1982 |
| JP | | 06190621 A | * | 7/1994 |

(Continued)

*Primary Examiner* — Daniel Howell
*Assistant Examiner* — Nicole N Ramos

(57) ABSTRACT

In a case where a tool holder 5 having a plurality of cutting tools T are attachably/detachably mounted on a base member 8, the tool holder 5 is formed in a ring shape and has depressions 5a and projections 5b on an inner periphery, and by aligning the depressions and projections 5a, 5b of the tool holder 5 with projections 9b and depressions 9a formed on an outer periphery of a rotating member 9 rotatably mounted on the base member 8, the tool holder 5 is mountable to or removal from the base member 8. The tool holder 5 is clamped to the base member 8 by being pressed against a seating surface 8e of the base member 8.

6 Claims, 11 Drawing Sheets

(56) References Cited

U.S. PATENT DOCUMENTS 4,964,762 A * 10/1990 Arai .................. B23B 31/008
                                                    407/34
4,979,853 A * 12/1990 Field ................. B23B 31/305
                                                    269/48.1
2010/0104382 A1    4/2010 Heinloth et al.

FOREIGN PATENT DOCUMENTS

| JP | EP 0758569 A1 | * | 2/1997 | ........... B23Q 17/006 |
| JP | 09076112 A    | * | 3/1997 | |
| JP | 2010521328 A  |   | 6/2010 | |

* cited by examiner

FIG. 6
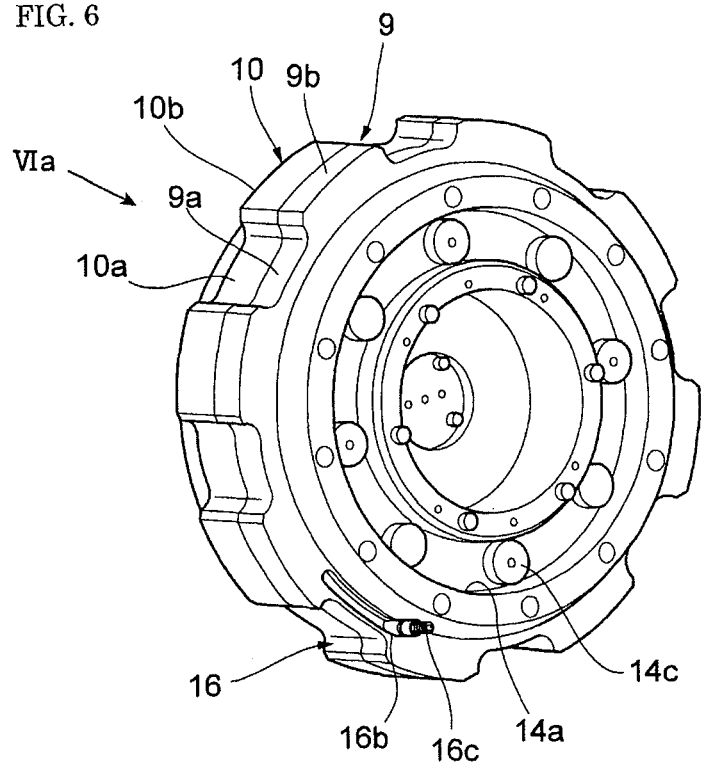
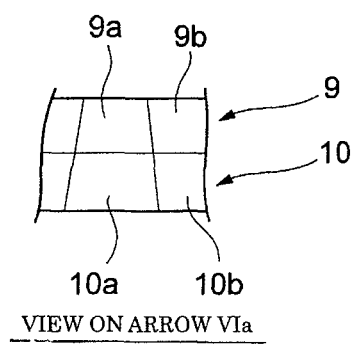
VIEW ON ARROW VIa

ROTATION RESTRICTING PIN
UNCLAMPING POSITION (SEATING OFF)

ROTATION RESTRICTING PIN CLAMPING POSITION (SEATING ON)

TOOL HOLDER ATTACHING/DETACHING STRUCTURE OF MACHINE TOOL

BACKGROUND OF THE INVENTION

1. Field of the Invention

The present invention relates to a tool holder attaching/detaching structure of a machine tool in which a tool holder including a plurality of cutting tools is attachably/detachably mounted on a base member such as a rotary indexing shaft.

2. Description of the Related Art

There is a machine tool including a tool holder to whose outer periphery a plurality of cutting tools are attached (for example, refer to Japanese Patent Publication No. 2010-521328 or its English language counterpart, US Patent Publication No. 2010/0104382).

In the machine tool of this type, in order to perform changing, repairing, and so on of the cutting tools, it is necessary for the tool holder to be detachable from a base member of the machine. A conceivable structure making the tool holder attachable/detachable is a structure in which the tool holder is fixed to the base member by bolting. In the case of this structure, in order to perform an attaching/detaching work of the tool holder, a worker fastens or loosens the fixing bolt while positioning and supporting the tool holder on a mounting surface of the base member.

Having the many cutting tools, the tool holder has a considerable weight. Therefore, the aforesaid work of the fastening and so on of the fixing bolt while supporting the tool holder by the worker is a considerable burden for the worker. Such circumstances have given rise to a demand for an attaching/detaching structure enabling the easy and sure attachment/detachment of the tool holder.

SUMMARY OF THE INVENTION

It is an object of the present invention to provide a tool holder attaching/detaching structure of a machine tool enabling the easy and sure attachment/detachment work of a tool holder.

A tool holder attaching/detaching structure of a machine tool according to the present invention is a tool holder attaching/detaching structure of a machine tool comprising:

a base member having a seating surface;

a rotating member having depressions and projections on an outer periphery and rotatably mounted on the base member; and a tool holder in a ring shape having depressions and projections on an inner periphery and having a plurality of cutting tools on an outer periphery, wherein, by aligning the depressions and the projections of the tool holder with the projections and the depressions of the rotating member, the tool holder is mountable to or removable from the base member, and wherein the tool holder is clamped to the base member by being pressed against the seating surface of the base member.

According to the present invention, it is possible to easily and surely mount the tool holder to the base member by a simple work of only aligning the depressions and the projections of the tool holder with the depressions and the projections of the rotating member, and it is possible to clamp the tool holder only by pressing the tool holder to the seating surface of the base member. Therefore, the mounting of the tool holder to the base member is easy and the trouble of the work can be saved.

In a suitable embodiment of the present invention, the tool holder attaching/detaching structure further includes a ring-shaped clamping member mounted on the base member, wherein the tool holder is clamped to the base member by the clamping member pressing the tool holder against the seating surface.

In the above suitable embodiment, since the tool holder is clamped to the base member by the clamping member, which is mounted on the base, pressing the tool holder against the seating surface, a clamping work of the tool holder to the base member is easy as compared with a case where the tool holder is fixed to the base member by bolting, which can reduce the trouble of the work.

In another suitable embodiment of the present invention, the tool holder is clamped to the base member by the clamping member pressing the tool holder against the seating surface in a state where the rotating member is rotated so that the projections of the rotating member and the projections of the tool holder at least partly overlap with each other.

In the above suitable embodiment, the tool holder is clamped by the clamping member pressing the tool holder against the seating surface in the state where the projections of the rotating member and the projections of the tool holder at least partly overlap with each other. Therefore, the rotating member presses the tool holder with a relatively wide area, which can ensure that the tool holder is stably clamped to the seating surface.

In still another suitable embodiment of the present invention, the clamping member is rotatably mounted on the base member and has depressions and projections on an outer periphery, and the depressions of the rotating member and the clamping member are tapered grooves which continuously become wider toward portions more apart from the seating surface.

In the above still another suitable embodiment, the depressions of the rotating member and the clamping member are the tapered grooves which continuously become wider toward portions more apart from the seating surface. Therefore, it is easy to align the projections of the tool holder with the wide depressions of the rotating member. Further, it is possible to seat the tool holder normally on the seating surface of the base member only by making the tool holder abut on the seating surface as it is, and in this respect as well, the easy and sure mounting work of the tool holder to the base member is enabled.

In yet another suitable embodiment of the present invention, the tool holder attaching/detaching structure further includes a seating detection mechanism which detects that the tool holder is normally seated on the seating surface when a pressure of air pressure-fed between the tool holder and the seating surface is equal to or more than a predetermined value, wherein the clamping by the clamping member is executed based on a seating detection signal of the seating detection sensor.

In the yet another suitable embodiment, the seating detection mechanism which detects that the tool holder is normally seated based on the pressure of the air pressure-fed between the tool holder and the seating surface is provided. Therefore, it is possible to easily and surely detect that the tool holder is not normally seated on the seating surface since the pressure of the air does not become equal to or higher than the predetermined value when, for example, chips and the like are caught between the tool holder and the seating surface. Therefore, it is possible to prevent the clamping from being executed while the seating state is not normal.

In a yet another suitable embodiment of the present invention, the tool holder attaching/detaching structure further includes a projection detection sensor which detects that the projections of the rotating member and the projections of the tool holder come to have a predetermined positional relation, wherein the clamping by the clamping member is executed based on a projection detection signal by the projection detection sensor.

In the above yet another suitable embodiment, the projection detection sensor which detects that the projections of the rotating member and the projections of the tool holder are aligned with each other is provided, which can prevent the clamping from being executed in a state where the projections of the rotating member do not normally overlap with the projections of the tool holder.

BRIEF DESCRIPTION OF THE DRAWINGS

FIG. 6 is a perspective view of a rotating member and a clamping member of the attaching/detaching structure seen from a tool holder side.

DETAILED DESCRIPTION OF THE PREFERRED EMBODIMENT

Figure 1:
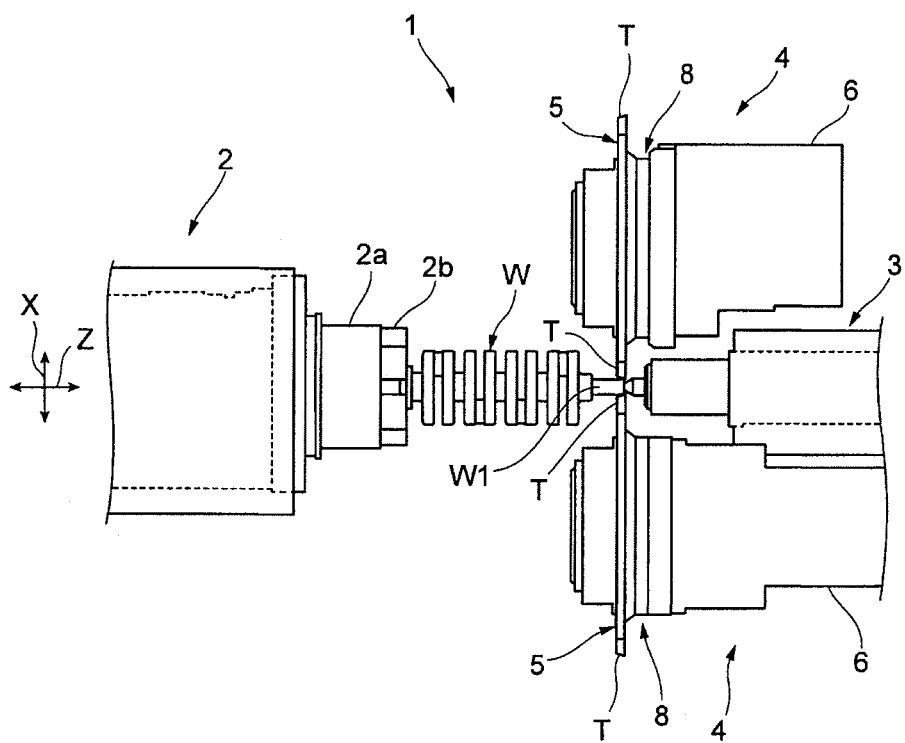
FIG. 1 is a schematic front view of a machine tool including a tool holder attaching/detaching structure according to an embodiment 1 of the present invention.
Figure 2:
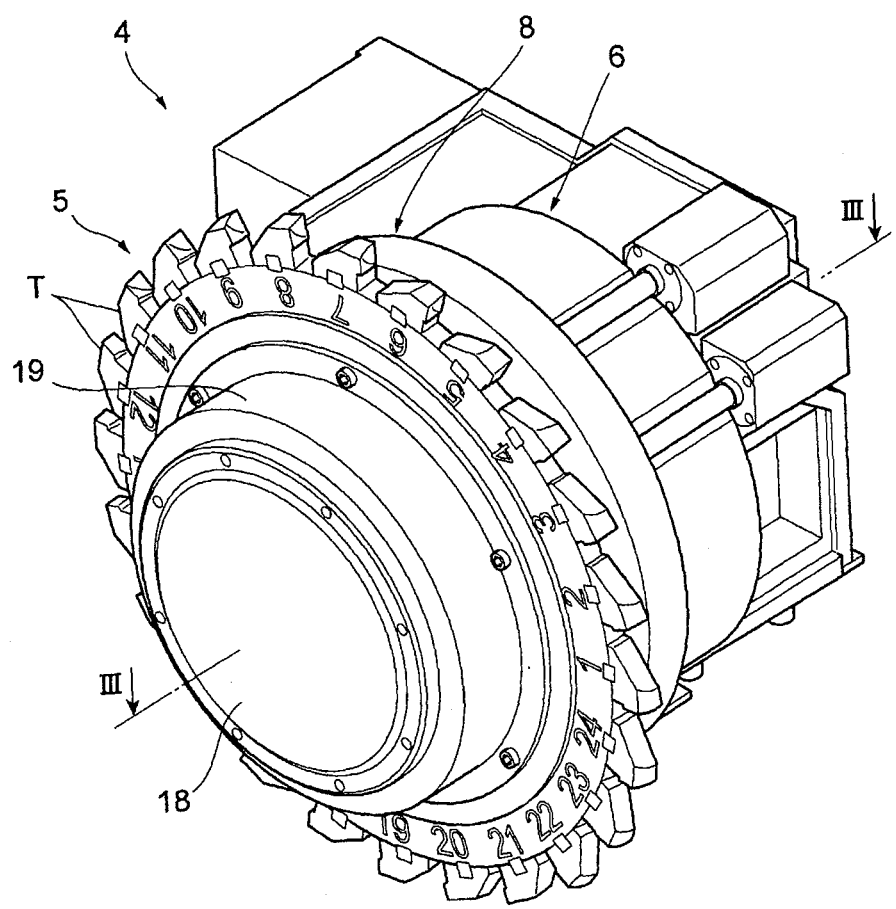
FIG. 2 is a front perspective view of a tool post of the machine tool.

Hereinafter, an embodiment of the present invention will be described based on the attached drawings.

FIG. 1 to FIG. 11D are explanatory views of a tool holder attaching/detaching structure of a machine tool according to an embodiment 1 of the present invention.

In the drawings, 1 denotes the machine tool including the tool holder attaching/detaching structure of this embodiment. The machine tool 1 includes: a spindle headstock 2 disposed on a not-shown bed; a tailstock 3 coaxial with the spindle headstock 2 and disposed to be movable in its axial (Z-axis) direction; and tool posts 4, 4 disposed on both sides of the Z axis to be movable in the Z-axis direction and in an X-axis direction perpendicular to the Z-axis.

In the machine tool 1, one end of a workpiece W such as a crankshaft is grasped by a chuck 2b mounted on a spindle 2a of the spindle headstock 2, the other end is supported by the tailstock 3, and cutting edges of cutting tools T fixed to tool holders 5 of the tool posts 4, 4 cut into, for example, a work target portion W1 of the workpiece W while the workpiece W is rotated by the spindle 2a, whereby a turning work is performed.

The tool post 4 includes a housing part 6 supported by the bed to be movable in the Z-axis and X-axis directions; a base member 8 whose supported cylinder portion 8d is rotatably supported via a bearing 7 by a support shaft portion 6a formed in the housing part 6; the tool holder 5 attachably/detachably supported by a first support portion 8a of the base member 8; a rotating member 9 rotatably supported by a second support portion 8b of the base member 8; and a clamping member 10 supported by a third support portion 8c of the base member 8.

Incidentally, a disk-shaped clamp cover 18 is mounted on a front surface of the clamping member 10, and outer peripheral portions of the rotating member 9 and the clamping member 10 are covered by a ring-shaped attachable/detachable cover 19 attachably/detachably mounted on a front surface of the tool holder 5.

An indexing shaft 11 is rotatably inserted in the housing 6. A tip portion of the indexing shaft 11 is coupled to a center portion of the clamping member 10, and between a rear half portion of the indexing shaft 11 and the housing 6, an indexing motor 12 is mounted.

Further, an unclamping hydraulic pressure supply path 11a and clamping hydraulic pressure supply paths 11b are formed in the indexing shaft 11, and a rotating joint 13 which supplies a hydraulic pressure to the hydraulic pressure supply paths 11a, 11b are mounted on a rear end portion 11c of the indexing shaft 11.

The base member 8 has the first support portion 8a supporting an inner peripheral surface of the tool holder 5 and also has a seating surface 8e on which a rear surface 5c of the tool holder 5 abuts. Note that a seating surface 8e-side portion of the first support portion 8a is formed in a male tapered shape.

The tool holder 5 is a ring-shaped body cut out from a plank, and to its outer peripheral surface, a large number of the cutting tools T are fixed by bolting. Further, on the inner peripheral surface of the tool holder 5, depressions 5a and projections 5b are formed at a predetermined pitch. Tip surfaces 5b', of the projections 5b, which as a whole form the inner peripheral surface of the tool holder 5, are formed to be fittable in the first support portion 8a of the base member 8, and the rear surface 5c of the tool holder 5 is capable of being in close contact with the seating surface 8e of the base member 8.

Further, a positioning recessed portion 5d is provided in the rear surface 5c of the tool holder 5, and a positioning key 17 fixed to the seating surface 8e of the base member 8 by a bolt 17a is fitted in the positioning recessed portion 5d, thereby restricting an angular position of the tool holder 5 in terms of its circumferential direction and not allowing the tool holder 5 to move in the circumferential direction relatively to the base member 8.

Further, the rotating member 9 is a ring-shaped body cut out from a plank. An inner peripheral surface of the rotating member 9 is rotatably supported by the second support portion 8b of the base member 8, and on an outer peripheral surface of the rotating member 9, depressions 9a and projections 9b are formed at the same pitch as that of the depressions 5a and the projections 5b of the tool holder 5.

Furthermore, the clamping member 10 is made of a plank and has a disk shape, and on its outer peripheral surface, depressions 10a and projections 10b are formed at the same pitch as that of the depressions 9a and the projections 9b of the rotating member 9. Further, on a rear surface, of the clamping member 10, located on an axial direction inner side, a supported surface 10c is provided in a recessed form so as to be smaller in diameter than the depressions 10e, and the supported surface 10c is rotatably supported by the third support portion 8c of the base member 8.

Here, the depressions 9a of the rotating member 9 and the depressions 10a of the clamping member 10 are formed so as to form tapered grooves which become wider as they are more apart from the seating surface 8e of the base member 8 and so as to be continuous to each other when the both are aligned with each other. On the other hand, a width dimension of each of the projections 5b of the tool holder 5 is set so that they can pass in the tapered grooves of the depressions 10a, 9a of the clamping member 10 and the rotating member 9.

Figure 3:
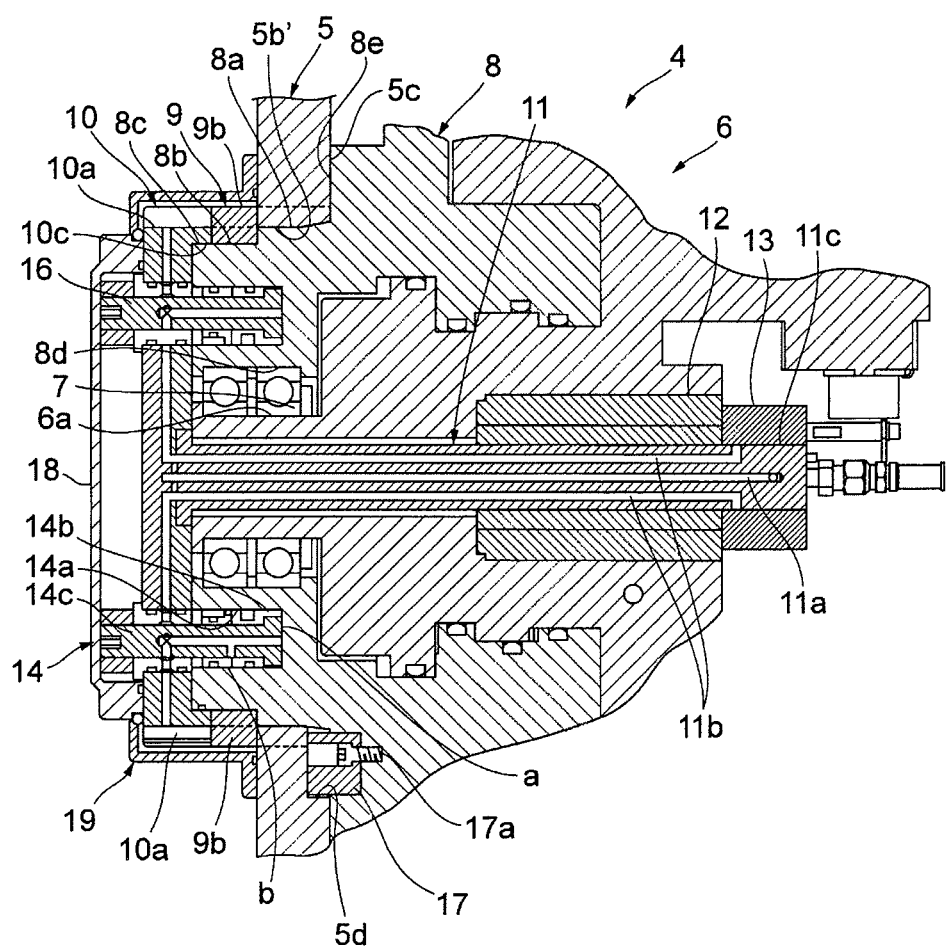
FIG. 3 is a cross-sectional view (cross-sectional view taken along line in FIG. 2) of the attaching/detaching structure.

Between the base member 8 and the clamping member 10, a cylinder mechanism 14 is formed which transmits the rotation of the indexing shaft 11, and further the rotation of the clamping member 10 to the base member 8 and drives the clamping member 10 in a clamping direction (right direction in FIG. 3) or an unclamping direction (left direction in FIG. 3).

The cylinder mechanism 14 has a structure in which a ring-shaped piston 14b is disposed in a cylinder hole 14e formed in a ring shape in the base member 8 and a plurality of connecting rods 14c hooked to the piston 14b are connected to the clamping member 10 via a fixing member 14d. Note that 14e denotes a stopper which restricts the movement of the piston 14b.

The clamping hydraulic pressure supply path 11b is connected to and communicates with a clamping oil chamber b of the cylinder mechanism 14, and the unclamping hydraulic pressure supply path 11a is connected to and communicates with an unclamping oil chamber a of the cylinder mechanism 14.

Figure 4:
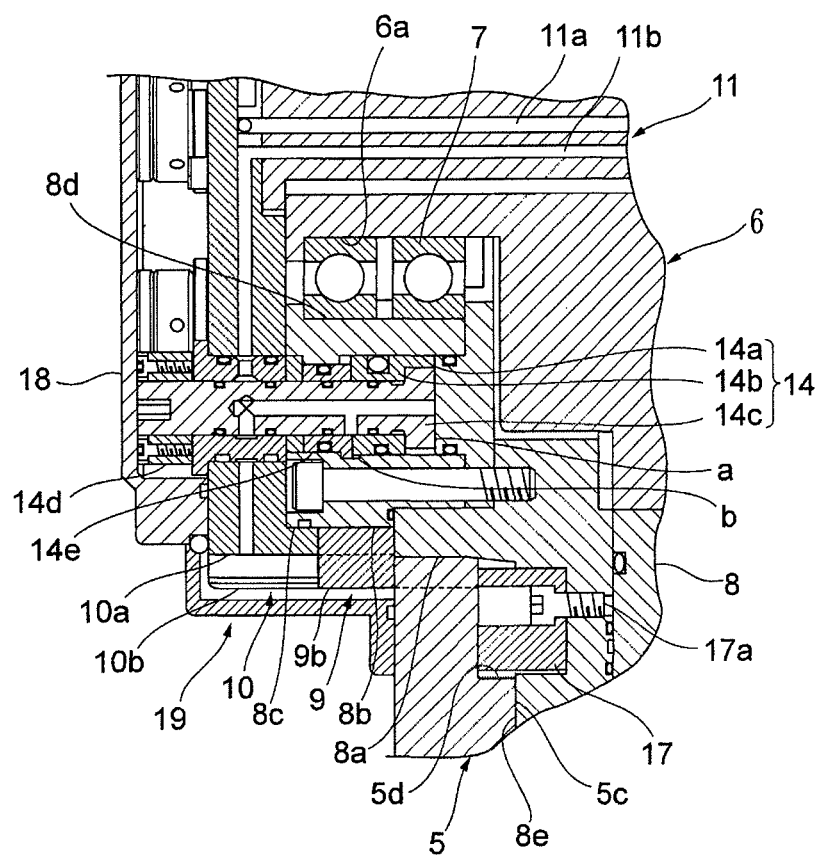
FIG. 4 is an enlarged plane view of the vicinity of a cylinder mechanism of the attaching/detaching structure.
Figure 5:
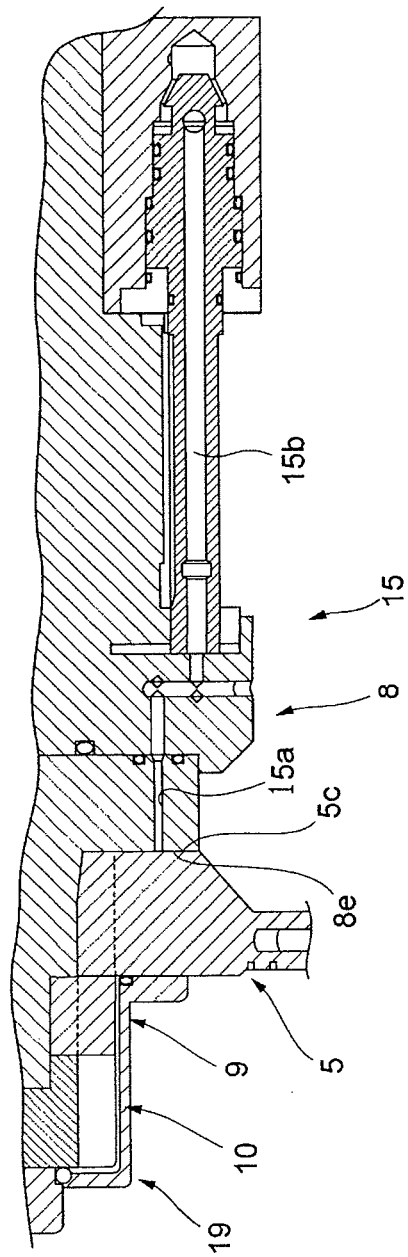
FIG. 5 is a cross-sectional view illustrating a seating detection mechanism of the attaching/detaching structure.

When the hydraulic pressure is supplied to the clamping oil chamber b, the piston 14b drives the clamping member 10 rightward in FIG. 3 and FIG. 4 via the connecting rods 14c, the clamping member 10 presses the tool holder 5 via the rotating member 9, the rear surface 5c of the tool holder 5 comes into pressure contact with the seating surface 8e of the base member 8, and the tool holder 5 is clamped to the base member 8.

On the other hand, when the hydraulic pressure is supplied to the unclamping oil chamber a, the connecting rods 14c together with the piston 14b are driven leftward in FIG. 3 and FIG. 4, and consequently the tool holder 5 is unclamped from the base member 8.

Here, when the hydraulic pressure is supplied to the clamping oil chamber b in a state where chips or the like are caught between the rear surface 5c of the tool holder 5 and the seating surface 8e of the base member 8, the clamping is not performed normally. In this embodiment, a seating detection mechanism 15 is provided which ensures the seating of the tool holder 5 on the seating surface 8e and detects that the seating has been normally completed.

The seating detection mechanism 15 has an air hole 15a formed to be open in the seating surface 8e, and a compressed air source is connected to the air hole 15a via a compressed air supply path 15b. Further, in the compressed air supply path 15b, there is provided a seating detection sensor, though not shown, which detects an air pressure of the path 15b, and further the opening portion, of the air hole 15a, which is open to the seating surface 8e, and outputs a seating completion signal when the air pressure is equal to or higher than a predetermined value.

Further, in this embodiment, a rotation angle restriction mechanism 16 is provided which restricts a rotation angle of the rotating member 9 so that the projections 9b of the rotating member 9 and the projections 5b of the tool holder 5 have a predetermined angular positional relation, concretely, so that the both projections 9b, 5b overlap with each other when seen in the axial direction. The rotation angle restriction mechanism 16 has, in the base member 8, a guide hole 16a which is open toward the rotating member 9 side, and a restricting pin 16b is disposed so as to project from the opening into the guide hole 16a and so as to be biased in a projecting direction by a spring 16c. Further, a compressed air source is connected to the guide hole 16a via a compressed air supply path 16e.

A recessed groove 16d is provided in a base member 8-side surface (rear surface) of the rotating member 9, and a tip portion of the restricting pin 16b is inserted into the recessed groove 16d and is slidable in a circumferential direction. The recessed groove 16d is formed to have a circumferential length corresponding to the rotation angle of the rotating member 9, concretely, formed to have a little longer than a circumferential length of the depression 9a of the rotating member 9, and at an angular position that agrees with the depression 9a. Further, the recessed groove 16d gradually becomes shallower from its one end 16d' toward the other end 16d''. Furthermore, a stopping stepped portion 16b' is formed in the restricting pin 16b, and by the stopping stepped portion 16b' abutting on a corner portion 8b' of the second support portion 8b of the base member 8, a maximum insertion depth of the restricting pin 16b in the recessed groove 16d is restricted.

Here, when the rotating member 9 is rotated, the restricting pin 16b relatively moves from the one end 16d' to the other end 16d'' of the recessed groove 16d. When the restricting pin 16b is located at the one end 16d' of the recessed groove 16d, the rotating member 9 is in an unlocked state, and when the restricting pin 16b is located at the other end 16d'', the rotating member 9 is in a locked state (state in FIG. 7) where the projections 9b of the rotating member 9 overlap with the projections 5b of the tool holder 5.

Incidentally, a projection detection sensor, though not shown, which detects that the restricting pin 16b is relatively moved to the other end 16d'' of the recessed groove 16d, that is, the restricting pin 16b is at the clamping position so that the projections 9b of the rotating member 9 overlap with the projections 5b of the tool holder 5 may be further provided, and when a detection signal is output from the projection detection sensor, the clamping hydraulic pressure may be supplied to the cylinder mechanism 14.

An attaching/detaching work of the tool holder 5 in this embodiment will be described.

Figure 7:
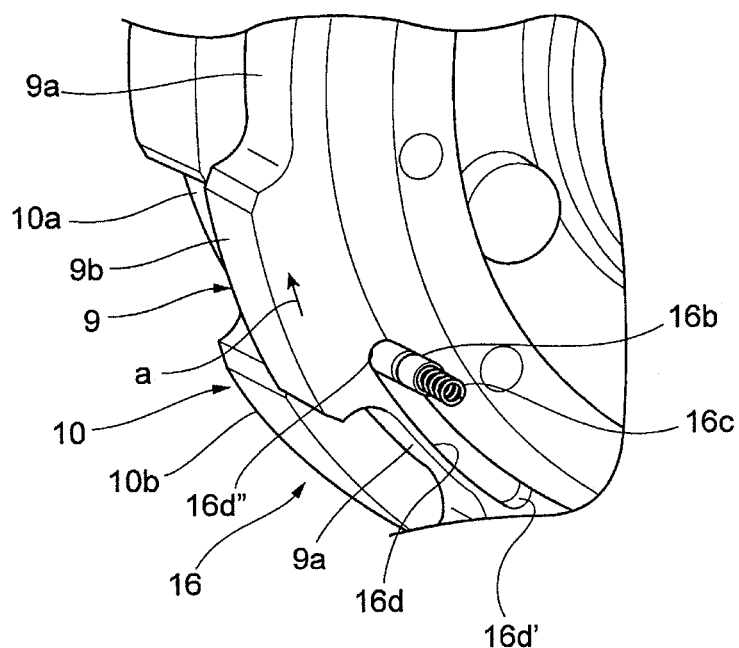
FIG. 7 is a perspective view of a rotation angle restriction mechanism of the attaching/detaching structure.
Figure 8:
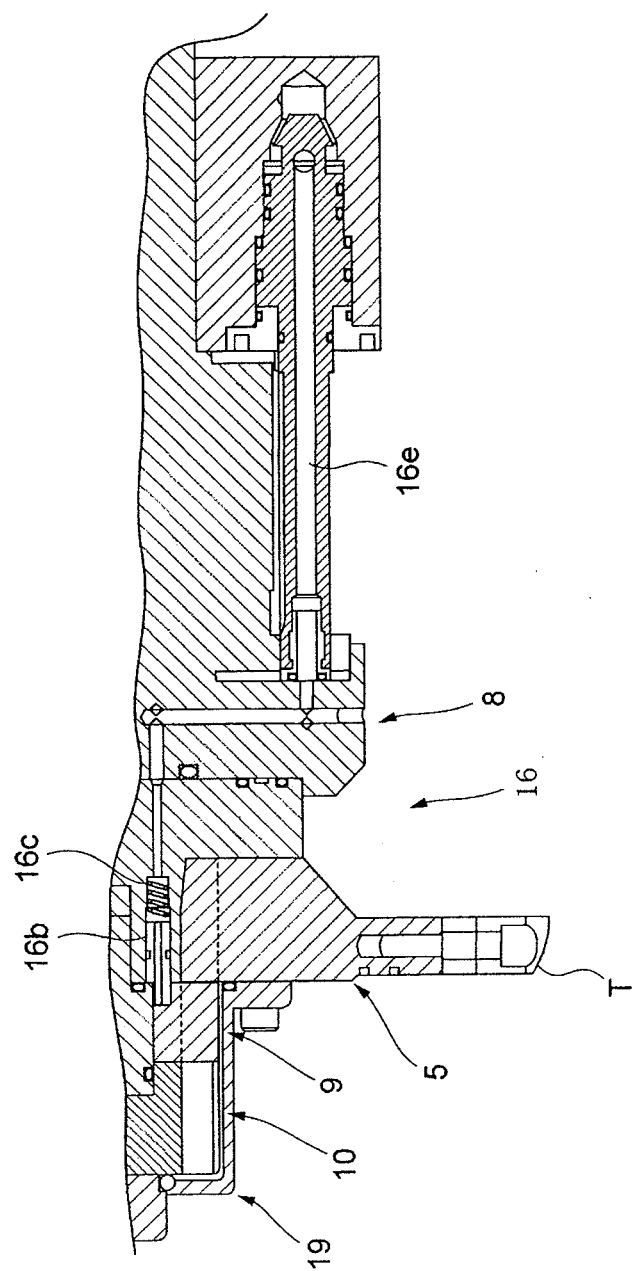
FIG. 8 is a cross-sectional view of the rotation angle restriction mechanism.
Figure 9:
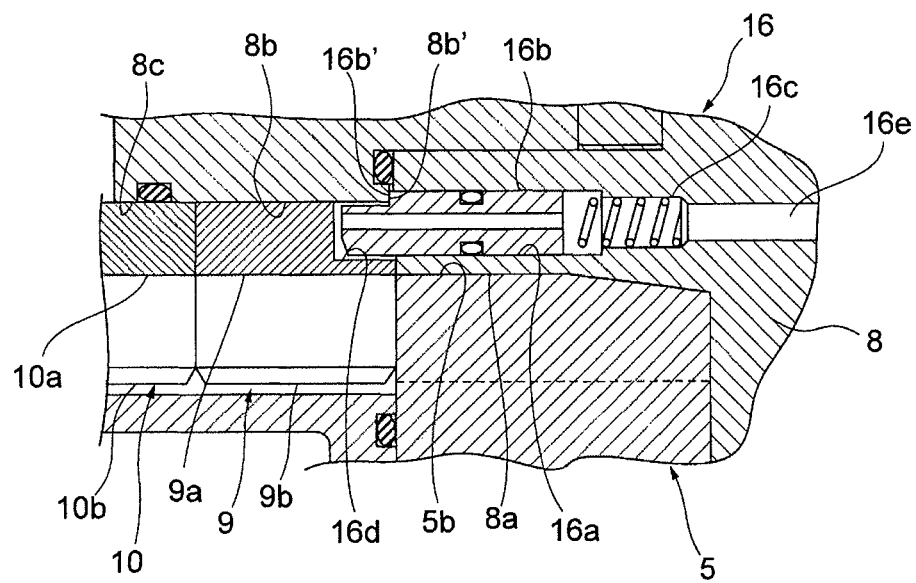
FIG. 9 is an enlarged view of a main part of the rotation angle restriction mechanism in an unclamping stated.
Figure 10:
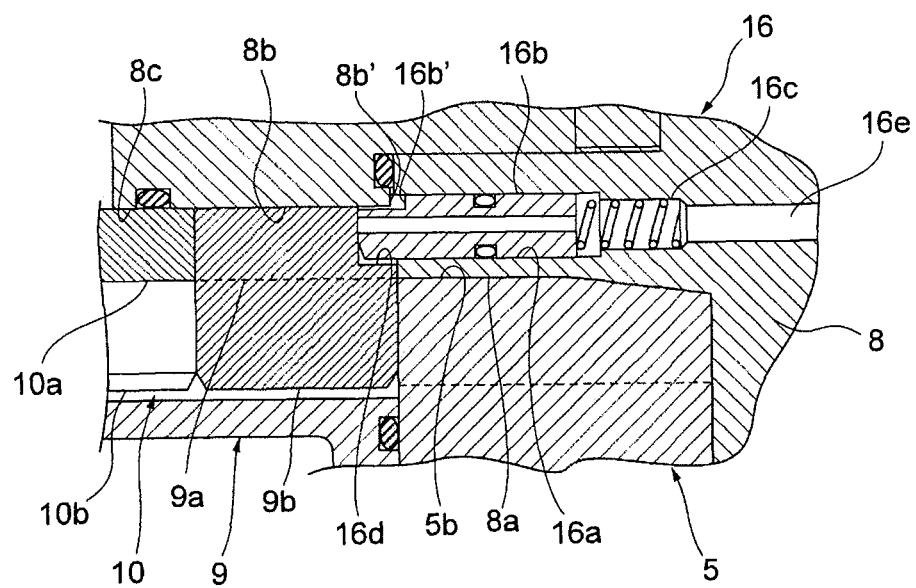
FIG. 10 is an enlarged view of the main part of the rotation angle restriction mechanism in a clamping state.
Figure 11:
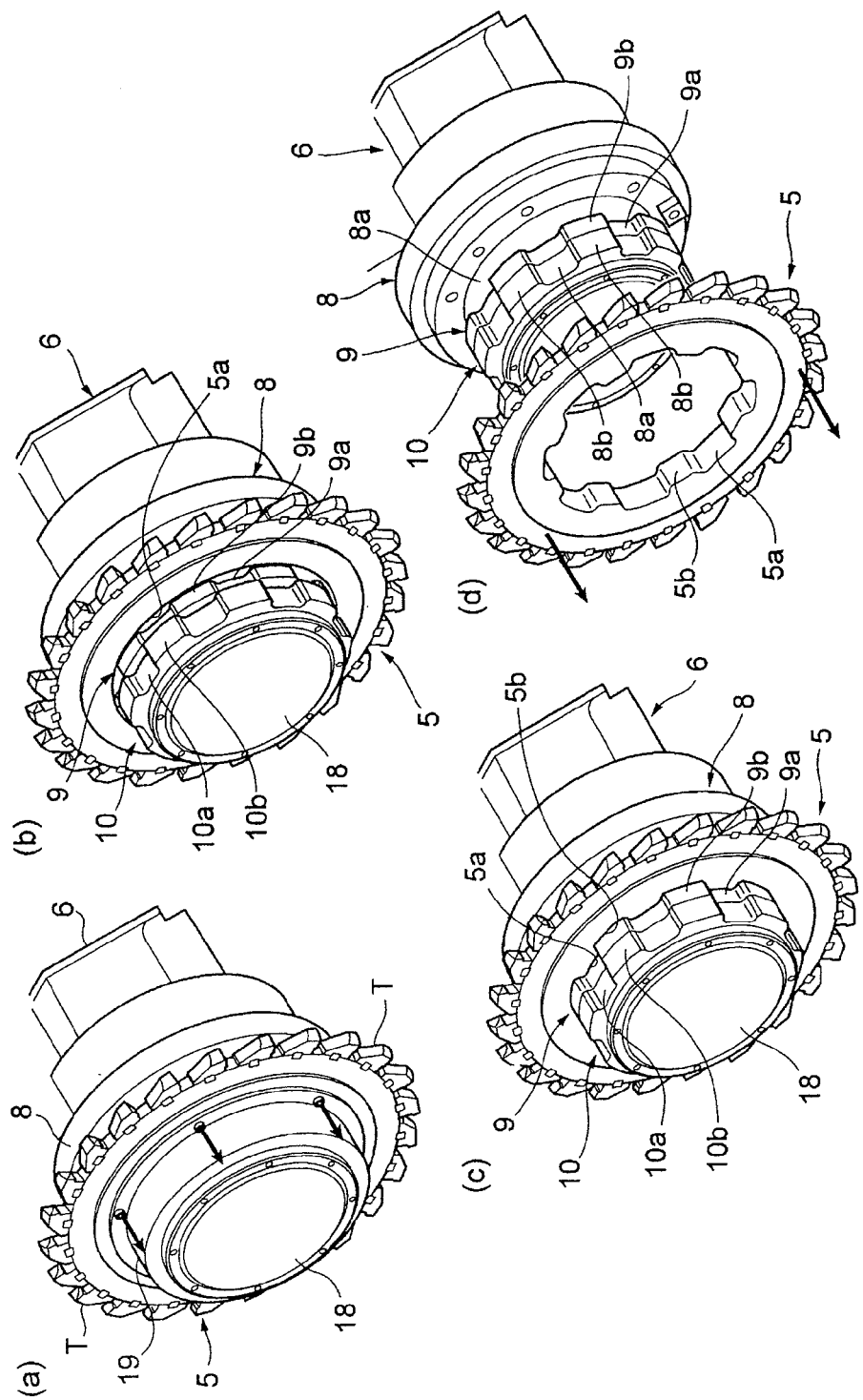
FIG. 11(a) to FIG. 11(d) are perspective views illustrating attaching/detaching steps of the attaching/detaching structure.

First, the clamping of the tool holder 5 by the clamping member 10 is released by the supply of the unclamping hydraulic pressure to the cylinder mechanism 14, and the attachable/detachable cover 19 covering the outer peripheries of the rotating member 9 and the clamping member 10 is removed from the front surface of the tool holder 5 (FIG. 11(a)). Consequently, the depressions 10a, 9a and the projections 10b, 9b of the clamping member 10 and the rotating member 9 are exposed. At this time, the rotating member 9 is at such a position that its projections 9b overlap with the projections 5b of the tool holder 5 and overlap with the depressions 10a of the clamping member 10 (FIG. 11(b)). That is, the rotating member 9 is at the clamping position, and the restricting pin 16b of the rotation angle restriction mechanism 16 is located at the other end 16d'' of the recessed groove 16d as illustrated in FIG. 7.

Subsequently, the rotating member 9 is rotated in the arrow a direction in FIG. 11(b) until the restricting pin 16b in the rotation angle restriction mechanism 16 relatively moves in the recessed groove 16d up to the other end 16d''. Consequently, the depressions 9a and the projections 9b of the rotating member 9 are aligned with the depressions 10a and the projections 10b of the clamping member 10 and the projections 5b and the depressions 5a of the tool holder 5 (FIG. 11(c)). Consequently, the tool holder 5 can be pulled forward (FIG. 11(d)).

It goes without saying that a work of mounting the tool holder 5 to the base member 8 is done in a reverse order to the above.

According to this embodiment, it is possible to easily and surely mount the tool holder 5 to the base member 8 only by a simple work of aligning the projections 5b and the depressions 5a of the tool holder 5 with the depressions 9a and the projections 9b of the rotating member 9. Further, only by supplying the clamping hydraulic pressure to the cylinder mechanism 14 in this state, it is possible to press and clamp the tool holder 5 to the seating surface 8e of the base member 8. This facilitates the mounting of the tool holder 5 to the base member 8, and the attaching and detaching work is easy and the trouble of the work can be greatly saved, as compared with a conventional structure in which the tool holder is fixed to the base member by bolting.

Further, the tool holder 5 is clamped by the clamping member 10 pressing the tool holder 5 against the seating surface 8e of the base member 8 via the rotating member 9 in the state where the projections 9b of the rotating member 9 are aligned with the projections 5b of the tool holder 5, and therefore, the rotating member 9 presses the tool holder 5 with a relatively wide area, which can ensure that the tool holder 5 is stably clamped to the seating surface 8e.

Further, since the depressions 9a, 10a of the rotating member 9 and the clamping member 10 are tapered grooves which continuously become wider as they go more apart from the seating surface 8e, it is easy to align the projections 5b of the tool holder 5 with the wide depressions of the clamping member 10 and the rotating member 9, and only by making the tool holder 5 abut on the seating surface 8e in this state, the tool holder 5 can be normally seated on the seating surface 8e of the base member 8. In this respect as well, it is possible to easily and surely perform the mounting work of the tool holder 5 to the base member 8.

Further, in this embodiment, since the seating detection mechanism 15 is provided which, based on the pressure of the air pressure-fed between the tool holder 5 and the seating surface 8e, detects that the tool holder 5 is normally seated, it is possible to easily and surely detect that the tool holder 5 is not normally seated on the seating surface 8e because the air pressure does not become equal to or higher than the predetermined value when, for example, chips or the like are caught between the rear surface 5c of the tool holder 5 and the seating surface 8e. Further, the hydraulic pressure is not supplied to the clamping hydraulic pressure supply path 11b before the seating detection signal is input, which can prevent the tool holder 5 from being clamped in the state where the chips or the like are caught.

Further, in the seating detection mechanism 15, the compressed air from the air hole 15a can blow away the chips or the like remaining between the rear surface 5c of the tool holder 5 and the seating surface 8e.

Further, since the rotation angle restriction mechanism 16 which restricts the rotation angle of the rotating member 9 is provided, it is possible to easily and surely rotate the rotating member 9 to the unclamping position or the clamping position by rotating the rotating member 9 until the restricting pin 16b reaches the one end 16d' or the other end 16d" of the recessed groove 16d. In this respect as well, it is possible to easily and surely perform the attaching/detaching work of the tool holder 5.

Further, in the case where the projection detection sensor which detects that the projections 9b of the rotating member 9 are at the clamping position is provided and the clamping hydraulic pressure is supplied to the cylinder mechanism 14 based on the projection detection signal, it is possible to prevent the clamping from being performed in a state where the projections 9b of the rotating member 9 do not normally overlap with the projections 5b of the tool holder 5.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A tool holder attaching/detaching structure of a machine tool, comprising:
   a base member having a seating surface;
   a rotating member having depressions and projections on an outer periphery and rotatably mounted on the base member; and
   a tool holder in a ring shape having depressions and projections on an inner periphery and having a plurality of cutting tools on an outer periphery,
   wherein, by aligning the depressions and the projections of the tool holder with the projections and the depressions of the rotating member, the tool holder is mountable to or removable from the base member; and
   a ring-shaped clamping member mounted on the base member, wherein the tool holder is clamped to the base member by the clamping member pressing the tool holder against the seating surface,
   wherein the tool holder is clamped to the base member by being pressed against the seating surface of the base member,
   wherein the tool holder is clamped to the base member by the clamping member pressing the tool holder against the seating surface in a state where the rotating member is rotated so that the projections of the rotating member and the projections of the tool holder at least partly overlap with each other, and
   wherein the clamping member is rotatably mounted on the base member and has depressions and projections on an outer periphery, and wherein the depressions of the rotating member and the clamping member are tapered grooves which continuously become wider toward portions more apart from the seating surface.

2. A tool holder attaching/detaching structure of a machine tool, comprising:
   a base member having a seating surface:
   a rotating member having depressions and projections on an outer periphery and rotatably mounted on the base member; and
   a tool holder in a ring shape having depressions and projections on an inner periphery and having a plurality of cutting tools on an outer periphery,
   wherein, by aligning the depressions and the projections of the tool holder with the projections and the depressions of the rotating member, the tool holder is mountable to or removable from the base member;
   a ring-shaped clamping member mounted on the base member, wherein the tool holder is clamped to the base member by the clamping member pressing the tool holder against the seating surface; and
   a projection detection sensor which detects that the projections of the rotating member and the projections of the tool holder come to have a predetermined positional relation, wherein the clamping by the clamping member is executed based on a projection detection signal of the projection detection sensor,
  wherein the tool holder is clamped to the base member by being pressed against the seating surface of the base member, and
  wherein the tool holder is clamped to the base member by the clamping member pressing the tool holder against the seating surface in a state where the rotating member is rotated so that the projections of the rotating member and the projections of the tool holder at least partly overlap with each other.

3. The tool holder attaching/detaching structure of the machine tool according to claim 1, further comprising
  a seating detection mechanism which detects that the tool holder is normally seated on the seating surface when a pressure of air pressure-fed between the tool holder and the seating surface is equal to or more than a predetermined value,
  wherein the clamping by the clamping member is executed based on a seating detection signal of the seating detection mechanism.

4. The tool holder attaching/detaching structure of the machine tool according to claim 2, further comprising
  a seating detection mechanism which detects that the tool holder is, normally seated on the seating surface when a pressure of air pressure-fed between the tool holder and the seating surface is equal to or more than a predetermined value,
  wherein the clamping by the clamping member is executed based on a seating detection signal of the seating detection mechanism.

5. The tool holder attaching/detaching structure of the machine tool according to claim 1, further comprising
  a projection detection sensor which detects that the projections of the rotating member and the projections of the tool holder come to have a predetermined positional relation,
  wherein the clamping by the clamping member is executed based on a projection detection signal of the projection detection sensor.

6. The tool holder attaching/detaching structure of the machine tool according to claim 3, further comprising
  a projection detection sensor which detects that the projections of the rotating member and the projections of the tool holder come to have a predetermined positional relation,
  wherein the clamping by the clamping member is executed based on a projection detection signal of the projection detection sensor.

* * * * *